J. GRAVES.

Can for Transporting Liquid.

No. 8,113. Reissued March 5, 1878.

WITNESSES:

Henry N. Miller

C. Sedgwick

INVENTOR:

J. Graves

BY Munn & Co

ATTORNEYS.

N. PETERS, PHOTO-LITHOGRAPHER, WASHINGTON, D. C.

UNITED STATES PATENT OFFICE.

JOHN GRAVES, OF NEW YORK, N. Y.

IMPROVEMENT IN CANS FOR TRANSPORTING LIQUIDS.

Specification forming part of Letters Patent No. 196,083, dated October 16, 1877; Reissue No. 8,113, dated March 5, 1878; application filed February 25, 1878.

*To all whom it may concern:*

Figure 1:
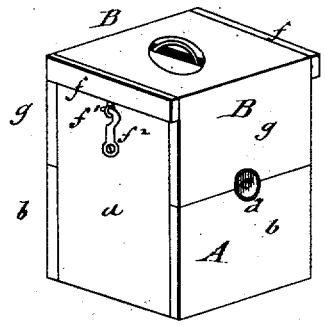
Figure 2:
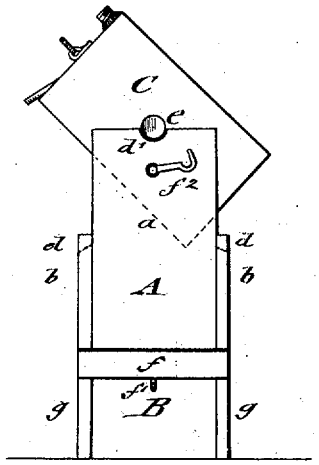
Figure 3:
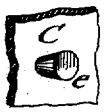

Be it known that I, JOHN GRAVES, of the city, county, and State of New York, have invented a new and Improved Can for Transporting Liquids, of which the following is a specification:

In the accompanying drawing, Figure 1 represents a perspective view of my improved can for transporting liquids. Fig. 2 is a side elevation of the same with cover removed and can placed in position for being tilted; and Fig. 3 is a detail side view of one of the conical side trunnions of the can.

Similar letters of reference indicate corresponding parts.

This invention relates to such improvements in cans for transporting oil and other liquids that the inclosing case or box may be readily opened, and the can arranged in position to swing on its trunnions for emptying the contents and the can be replaced in the case for return shipment.

The invention consists of a protecting box or case that incloses the can, and which is made of two sections, separated at or near the center of two of its sides, the lower section having bearings in the shorter sides, as well as in the extended transverse sides, for supporting the trunnions at the side of the can during transportation and when emptying the same.

By referring to the drawing, A represents the lower section of my improved protecting box or case for a can, C, for transporting liquids, and B is the upper or cover section of the case.

The lower section A is formed with a suitable base, to which are secured the sides *a* and *b*, the sides *a* extending above the top of the can C when the same is in position in the lower section. The sides *b* of the lower section are equal (or about equal) to one-half the height of the sides *a*, and provided with center bearings *d*, to support the trunnions *e* secured upon the sides of the can.

The upper section or cover B of the case has a central opening in the top, to allow the handle of the can to pass through when the two sections are locked together. The cover-section has two shorter sides, *f*, and two longer sides, *g*, the latter extending down to the trunnions of the can, and fitting over the same and to the edges of the shorter sides of the lower section.

The shorter sides *f* of the cover are provided with eyes $f^1$, into which hooks $f^2$ enter, so as to firmly lock the top section to the lower section of the case.

When the sections of the case are connected by the hooks, they form a complete box or packing-case, of which the longer sides of the lower section and the shorter sides of the cover-sections form two complete sides, to which the locking devices are applied, while the remaining sides of the case are formed by the sides of the lower and upper sections that meet at the trunnions at or about the center of the height of the case.

The meeting-edges of the upper box-section are recessed for the conical or other trunnions *e*, and the longer sides *a* of the lower section are also, like the shorter sides, arranged with central bearings or recesses *d'* at their upper edges, so that when it is desired to empty the can, and the top section is removed, the can may be lifted by the handle out of the lower section of the case, turned one-quarter around, and then placed into position in the bearings of the longer sides *a*. The can swings then easily on its trunnions for being emptied of its contents without interfering with the shorter sides of the lower section in swinging.

The upper section may be placed below the other section and used as a bench or stool for supporting the can in elevated position.

When the can is empty, it is replaced into its former position in the lower section, and then the upper section applied and locked thereto, so that the can and case are ready for return shipment and refilling, the sections forming an exceedingly simple, strong, and convenient protecting-case for oil and other cans.

Having thus described my invention, I claim as new and desire to secure by Letters Patent—

1. A box or case for oil and other cans, formed of two sections, separated at or near the center of two of its sides, the sides of the lower section having bearings to support the trunnions upon the sides of the can, substantially as and for the purpose set forth.

2. A box or case for oil and other liquids, made of two sections, separated at or near the center of two of its sides, the meeting-edges of these sides having bearings for the trunnions upon the sides of the can, while the remaining sides are arranged with locking devices for connecting the sections, substantially as described.

3. A box or case for oil and other cans, formed of two sections, separated at or near the center of two of its sides, the remaining sides of the lower section being extended above the can and provided with bearings for the trunnions upon the sides of the can, so that the can may be supported and tilted thereon, substantially as and for the purpose set forth.

JOHN GRAVES.

Witnesses:
C. SEDGWICK,
PAUL GOEPEL.